United States Patent Office

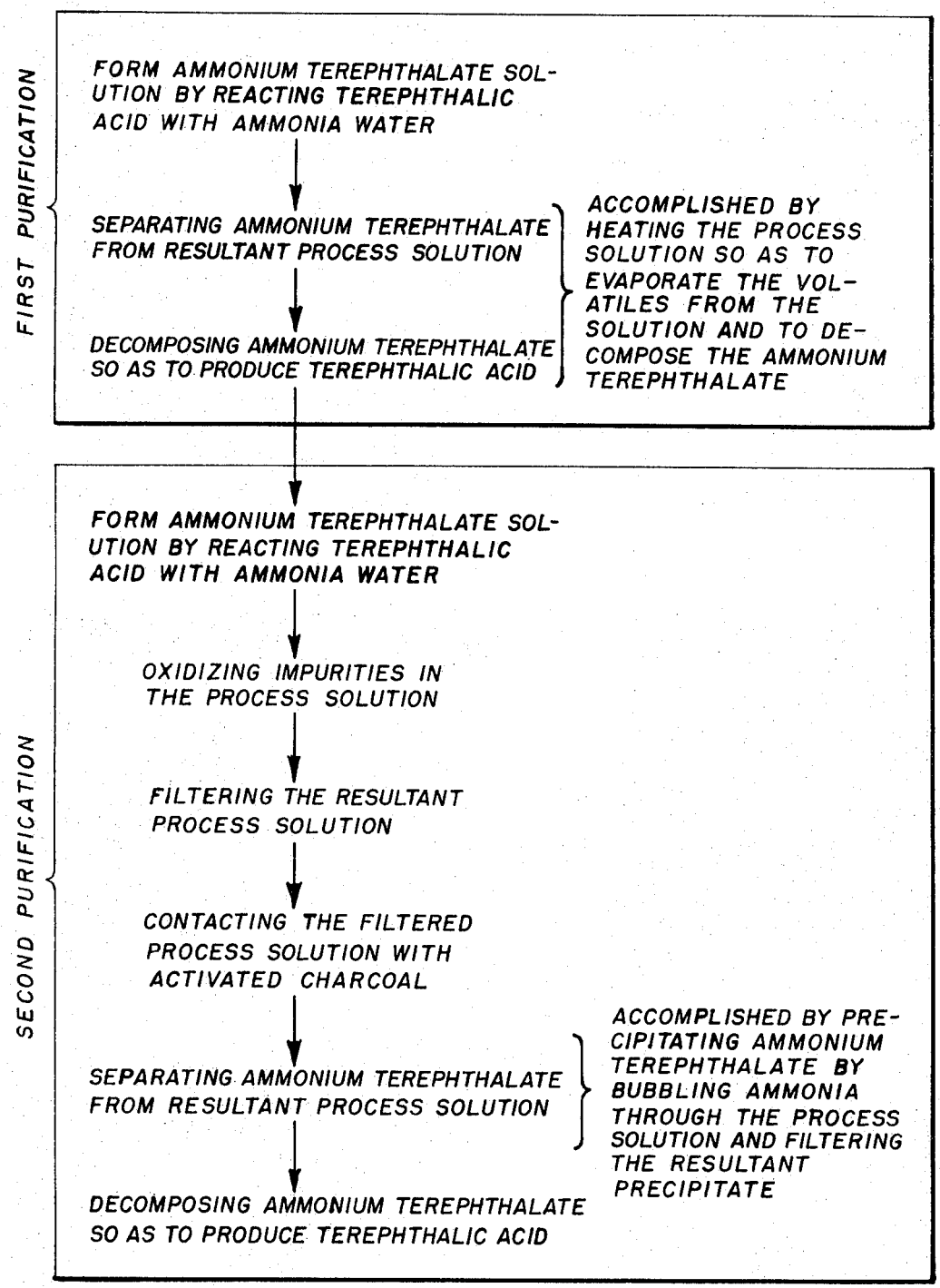

3,849,489
Patented Nov. 19, 1974

3,849,489
PURIFICATION OF TEREPHTHALIC ACID
Henryk S. Rudzki, 56 Via Capo le Case, Rome, Italy
Filed Jan. 21, 1971, Ser. No. 108,515
Int. Cl. C07c 51/42, 63/26
U.S. Cl. 260—525                                                3 Claims

ABSTRACT OF THE DISCLOSURE

Impure or crude terephthalic acid such as may be produced by various air oxidation or other processes can be purified to a degree suitable for such acid to be used in various polymers in which the purity of such acid is critical by at least once following the steps of: (1) forming a solution of ammonium terephthalate by reacting the terephthalic acid with ammonia in the presence of water, (2) separating the ammonium terephthalate from other materials in the solution, and (3) decomposing the ammonium terephthalate by heating it below its sublimation temperature to produce terephthalic acid. If desired, impurities in the ammonium terephthalate solution can be oxidized within the solution. The separation of the ammonium terephthalate can be performed by evaporating the solution or by precipitating the ammonium salt and physically separating it from the solution.

CROSS-REFERENCE TO RELATED APPLICATIONS

None.

BACKGROUND OF THE INVENTION

Terephthalic acid can be produced by various different processes. One type of process which is considered to be particularly advantageous for the production of this acid involves the oxidation of p-xylene with air. Such air oxidation type processes have been extensively investigated. It is considered that all of them, while advantageous economically as compared to other processes, are disadvantageous in that they produce an acid product which is sufficiently impure so that it cannot be satisfactorily used in the production of known polymer materials.

As a result of this processes for purifying crude or impure terephthalic acid as produced by these air oxidation processes have been extensively investigated. Such prior purification processes have involved a number of different chemical expedients, physical steps and the like. A detailed understanding of them is unnecessary to an understanding of the present invention. It is believed that they have not been satisfactory for any of a variety of reasons such as reasons pertaining to cost, effectiveness, equipment, requirements and the like.

SUMMARY OF THE INVENTION

An objective of the present invention is to provide new and improved procedures for the purification of terephthalic acid such as is produced by various known air oxidation processes so as to make such acid suitable for use in processes in which the purity of such acid is critical. It is not to be assumed from this that the invention is limited to the purification of terephthalic acid as produced by air oxidation type processes. The invention can be employed satisfactorily in purifying to a satisfactory degree impure or crude terephthalic acid as produced by other known processes than the air oxidation of p-xylene.

The invention is not limited, however, in its objectives to merely providing new and improved procedures for the purification of crude or impure terephthalic acid. The invention is intended to provide procedures for this purpose which may be easily and conveniently carried out with a minimum of difficulty at a comparatively nominal expense using known or conventional, relatively inexpensive equipment. If desired, however, specialized equipment can be employed in practicing the invention. The importance of these essentially economic factors are not to be neglected. They are all critical to the economic acceptance of the invention since in the field of the invention even comparatively small savings or advantages mark the difference between commercial success and failure.

In accordance with this invention crude or impure terephthalic acid is purified by at least once following the steps of: (1) forming a solution of ammonium terephthalate by reacting to the terephthalic acid being purified with ammonia in the presence of water, (2) separating the ammonium terephthalic from the other materials in the solution, and (3) finally decomposing the ammonium terephthalic by heating it below its sublimation temperature so as to decompose it in order to produce a purified terephthalic acid. The separation of the ammonium terephthalic can be performed by evaporating the solution of this salt or by precipitating the salt and physically separating it from the solution. Preferably in purifying the acid the process steps indicated are repeated twice with the first separation being accomplished by such evaporation and the second separation being accomplished by such precipitation and physical separation. Preferably the impurities in an ammonium terephthalic solution produced in accordance with the process can be oxidized within this solution.

BRIEF DESCRIPTION OF THE DRAWING

In any summary of this type it is inherently impossible to fully set forth or explain an invention. The complete nature of the present invention is best more fully explained with reference to the accompanying drawing in which:

There is shown a diagrammatic flow sheet corresponding to a preferred manner or mode of carrying out the present invention.

From the diagrammatic character of the drawing it will be apparent that the present invention can be practiced using many different types of equipment. In accordance with conventional process procedures solutions and gases separated or given off during the practice of a process in accordance with this invention may be recovered or recycled. Any use of the principles of this invention as indicated in the appended claims within such routine process skill is to be considered as a part of this invention.

DETAILED DESCRIPTION

In carrying out the invention it is preferred to twice purify the crude terephthalic acid being processed utilizing in each purification the essential process steps indicated in the preceding summary, but to vary the details of these steps each time they are carried out so that there will be a tendency for different impurities to be removed during each purification. This is indicated by the two blocks in the drawing labeled first and second purification.

In the first purification the crude or impure terephthalic acid as produced by the air oxidation of p-xylene or other processes containing minor amounts of contaminating compounds such as terephthaldehydic acid, terephthaldehyde and the like is reacted with ammonia in the presence of water so as to form ammonium terephthalate. This reaction is a conventional time-temperature reaction which will go on at a rate determined by the relative proportions of the reactants present and the degree of contact between these reactants.

Although it is considered that some ammonium terephthalate will form at temperatures even below 10° C. it is considered preferable that the reactions in this first step be carried out at a temperature of at least 20° C. for these reactions to be sufficiently rapid so that the process of the invention may be economically carried out without unduly tying up equipment, etc. It is considered that if the temperature used in carrying out this first step is over about 30° C. that there may be an undue loss of ammonia from the ammonia water utilized due to vaporization and that this would be uneconomic. However, if desired higher temperatures up to the temperature at which ammonia water boils can be employed. As a practical matter this is considered to be approximately 100° C. If it is desired to use elevated temperatures above about 30° C. in forming the ammonium terephthalate salt it is considered necessary and desirable to use enclosed pressure type equipment so as to prevent the loss of undue amounts of ammonia and water.

It will be recognized that these temperature limits are not distinct limits at which reactions do or do not take place, but that they are essentially practical limits used because of practical considerations. Similarly, the amounts of ammonia used with the present invention are determined by essentially practical type considerations. Because of ease of handling and equipment required it is considered preferable to use common ammonia water as an ammonia source in this first step. Such water may be referred to as an aqueous solution of ammonia or as an ammonium hydroxide solution. Since in general the more concentrated the ammonia water used the greater the rate or reaction and the less the quantity of material handled it is preferred to utilize a relatively concentrated ammonium hydroxide solution. However, the ammonia content of such solution must not be so high as to tend to precipitate the ammonium terephthalic formed. The concentration of the ammonia solution used should be sufficiently great so that the reaction which takes place during this first step goes at a rate which does not unduly tie up the equipment being employed.

It is considered that satisfactory results can be achieved using commercially available ammonia water containing from 10 to 35% by weight ammonia. It is considered preferable however to use ammonia water at a concentration of from 20 to 35% by weight so that the process of the present invention may be carried out comparatively rapidly. It is considered that if greater amounts of ammonia were present during this first step such as might be present by bubbling ammonia gas through the liquid that there would be a significant danger of precipitation of the ammonium terephthalic produced. Although, as will be hereinafter indicated solid ammonium terephthalate is produced in accordance with the disclosed process the production of this salt at this stage of the process would make it difficult to handle the reacting composition as in transporting it to appropriate equipment for carrying out subsequent steps of the process.

The quantity of ammonia water which should be used in forming the ammonium terephthalate salt should contain ammonia significantly in excess of the amount required to stoichiometrically form this salt in order to assure that substantially all of the terephthalic acid present is reacted. Obviously, however, it is uneconomic to use an extreme excess over the amount of ammonia water needed because of the size of the equipment required and the like. In determining the quantity of ammonia water which should be used with the invention it is considered necessary to always take into consideration the amount of ammonia which will escape from such a solution during normal handling.

In view of these considerations it is considered that ammonia water containing at least 150% of stoichiometric quantity of ammonia needed to react with the terephthalic acid present should be used. It is considered preferable, however, to use even greater amounts—preferably at least three times the amount of ammonia required on a stoichiometric basis. If an extreme quantity of ammonia water is used it is considered that the equipment needed becomes unnecessarily large.

In order to facilitate handling and to permit the use of as small equipment as possible it is preferred that these factors governing the amount of ammonia used be related to the amount of acid being reacted so that an ultimate solution is achieved which is nearly, but not quite saturated with ammonium terephthalate. If the solution produced is saturated or over-saturated some product will crystallize or precipitate out of it. This is considered to be disadvantageous at this step of the process as pointed out in the preceding. If on the other hand, the solution produced is unduly dilute in the amount of ammonium terephthalate present, unnecessarily high volumes of the solution must be handled and this is considered uneconomic. Because of these factors it is considered that satisfactory results can be achieved by relating the amount and the concentration of the ammonia water employed to the amount of the terephthalic acid so that a solution will be produced containing from 10 to 17% by weight and preferably 15 to 17% by weight of the reacted terephthalic acid.

It will be recognized that such a solution will contain as impurities various impurities present in the crude or impure terephthalic acid as obtained from air oxidation or other processes. In accordance with this invention a significant quantity of such impurities is removed by the step marked in the drawing to show the separation of the ammonium terephthalate salt from other materials present in the solution. In the first purification indicated in the drawing such separation is carried out utilizing the same equipment employed in the ultimate step of this first purification—the step of decomposing the ammonium terephthalate to obtain purified terephthalic acid. As indicated by the drawing this separation step and this decomposition step are carried out by heating the process solution resulting from the initial step.

Such heating must be at a temperature sufficient to volatilize volatile ingredients of the solution and at a temperature sufficient to decompose the ammonium terephthalate without volatilizing or subliming this compound. The temperature of the process solution during the heating employed will of course be governed by the boiling point of the solution in much the same manner in which the temperature of water containing any salt remains constant until such time as substantially all of the water is removed. In order to avoid undue boiling of the solution being treated and a sharp, undesirably high rise in temperature when the solution is completely evaporated it is preferred to use with the invention controlled, moderate heat.

It is considered that such heat should be sufficiently below 300° C.—the approximate sublimation point of terephthalic acid—so that there is no danger of this product being vaporized. It is also considered that the heat used should be at least 275° C. since many contaminants which can be expected to be present such as p-toluic acid and terephthaladehyde boil at this or lower temperatures than this and since the ammonium terephthalate will decompose at this temperature. Such decomposition again is essentially a time-temperature reaction and in general the higher the temperature the shorter the time required to break down the ammonium terephthalate into ammonia gas which will be vaporized and terephthalic acid.

In view of these factors it is preferred to carry out the separation and decomposition steps indicated at a temperature at from about 280 to 290° C. When temperatures within this range are applied to the process solution the volatile materials present will be vaporized and, hence, separated from the ammonium terephthalate prior to this compound being significantly decomposed. If desired lower temperatures then within this range can be advantageously used until all volatiles are vaporized.

The terephthalic acid product from this first purification will be significantly reduced in organic impurities. Such purification may be adequate so that this acid can be used for some purposes. Preferably, however, to obtain an even purer acid it is possible to treat this product as indicated by the block labeled second purification in the drawing. Such treatment involves again placing the terephthalic acid in solution in the form of ammonium terephthalate as described in the preceding.

The resultant process solution preferably, but not necessarily, is then oxidized so as to oxidize any trace impurities such as p-toluic acid or related aldehydes to terephthalic acid. Such oxidation may conveniently be accomplished using conventional techniques and reagents. Because such techniques and reagents are well-known and are used in accordance with conventional practice this step in the process described is not delineated in detail herein. In one preferred manner of accomplishing such oxidation manganese peroxide is added to the process solution at an elevated temperature such as a temperature of from 50 to 100° C. and the mixture is stirred until such time as there is no chance for further oxidation. This step of the process will also tend to oxidize any trace quantities of metalic impurities such as iron to form hydrates of such metals which can normally be separated by physical means.

When this oxidation step is carried out such hydrates and any materials such as the manganese peroxide added are separated from the process solution by physical means such as filtration. Any terephthalic acid formed as a result of this oxidation will, under normal conditions, not be separated from the process solution at this step since the solution will normally contain adequate ammonia to react with such acid to produce ammonium terephthalate from it. Hence, the process solution obtained after such filtration will be essentially a purified ammonium terephthalate solution and only minor quantities of terephthalic acid will be lost in the filter cake.

This process solution may, however, be somewhat discolorized as a result of the oxidation step as a result of trace quantities of the oxidizing agent or the like. Because of this it is preferred to pass this process solution through a bed of highly absorbent carbon such as activated charcoal. Such carbon will normally remove any agents which may tend to discolorize the solution and, hence, will tend to remove impurities from the process solution. If desired finely ground activated carbon may be mixed with the process solution and separated from it by filtration instead of passing the process solution through a bed of such material.

In the second purification the ammonium terephthalate is separated from the process solution by a different method than is used in the first purification described in the preceding, although if desired the same separation described in conjunction with the first purification may be used. Conversely the separation used in this second purification may be used in the first if this is desired. It is considered, however, that the separation procedure in the first and second purifications should be different in order to promote impurity removal by somewhat different, though related procedures.

In this second separation the ammonium terephthalate is removed from the process solution by first being precipitated and then by being physically separated as by filtration. Such physical separation may be conveniently accomplished by bubbling ammonia gas through the process solution until substantially no further precipitate is formed. The temperature of the process solution during this time that the ammonia gas is bubbled through the process solution in order to saturate it is considered to be substantially immaterial. Merely for convenience it is considered preferable that the process solution be at normal ambient temperature of from about 20 to 25° C. during this step.

After the precipitation is substantially complete the precipitate may be separated as indicated in the preceding and the filtrate may be recycled so that any remaining ammonium terephthalate in it may be recovered. It may be recycled to either the process step of forming an ammonium terephthalate solution as herein indicated or it may be recycled to a separate process for forming terephthalic acid. In any event, the ammonium terephthalate solid product obtained in this manner is then heated as described in the first purification so as to remove liquid from it and so as to tend to volatilize remaining impurities in it and so as to decompose the ammonium terephthalate to ammonia and terephthalic acid. Temperatures as are used in the first purification are again employed to this second purification.

From this description it will be apparent that the preferred purification in accordance with this invention essentially involves two separate, yet related purifications. Each of these purifications can, if desired, be carried out independently of one another. When they are used in sequence as described they are very effective in removing normal impurities from terephthalic acid because they operate in slightly different ways, each of which is considered to be somewhat more effective with some impurities than others. Because of the small quantities of the impurities involved and difficulties with organic analysis it is considered substantially impossible, although not theoretically impossible, to completely indicate the advantages of one purification as herein described over the other in removing certain specified contaminants.

As an aid to the understanding of this invention the following specific example of a preferred procedure in accordance with the invention is set forth. This example is given by way of illustration only and is not to be considered as limiting the invention in any respect.

Example 100 gms. of crude or impure terephthalic acid as produced by air oxidation in accordance with the process described in the U.S. Pat. 3,361,803, issued Jan. 2, 1968, entitled "Process for the Production of Isophthalic and Terephthalic Acids," can be mixed with an amount of ammonia water containing 30% by weight ammonia at 25° C. ambient temperature for a time sufficient to form a solution containing 17% by weight terephthalic acid in the form of ammonium terephthalate. This salt will form in a relatively short period corresponding to the time necessary for the solid acid to disappear as the solution is agitated. Thereafter the resulting process solution can be heated at a temperature of from 280 to 290° C. until no volatiles remain. At this point all that will remain is purified terephthalic acid.

Thereafter this acid may then be placed in solution so as to form ammonium terephthalate as before using the same quantity of the same ammonia water specified at the same temperature indicated. 10 gms. of manganese peroxide may then be added and the solution may then be agitated for a period of 30 minutes. Thereafter the solution may be filtered and passed through a bed of activated charcoal until clear. The process solution may then be saturated with ammonia by bubbling ammonia through it until no further precipitate forms. This precipitate may then be separated by filtration and heated at a temperature of 280 to 290° C. until all volatiles are removed from it and until the ammonium terephthalate precipitate is decomposed so as to yield a purified terephthalic acid.

Further examples of the present invention could be set forth on the basis of the preceding example giving temperatures, concentrations, and times as indicated in this specification. It is considered that no useful purpose can be accomplished by giving such examples since they would be essentially repetitive.

I claim:

1. A process for the purification of impure terephthalic acid which comprises:

forming a first solution of ammonium terephthalate by contacting terephthalic acid to be purified with ammonia water containing from about 10 to about 35% by weight ammonia at a temperature of at least 10° C. and not in excess of 100° C. in an amount in excess of at least 150% of a stoichiometric quantity of ammonia needed to react with said terephthalic acid and in an amount necessary to form an unsaturated solution containing from 10 to 17% by weight reacted terephthalic acid so as to react said terephthalic acid with said ammonia to form ammonium terephthalate in an aqueous unsaturated solution, separating ammonium terephthalate from the remainder of said solution, decomposing said ammonium terephthalate to form a partially purified terephthalic acid product by heating said ammonium terephthalate at a temperature of at least about 275° C. at which impurities in said ammonium terephthalate are volatile and at a temperature at which said ammonium terephthalate decomposes to produce terephthalic acid, but at a temperature below about 300° C. so as to avoid sublimation of terephthalic acid, forming a further solution of ammonium terephthalate by contacting said partially purified terephthalic acid with ammonia water containing from about 10 to about 35% by weight ammonia at a temperature of at least 10° C. and not in excess of 100° C. in an amount in excess of at least 150% of a stoichiometric quantity of ammonia needed to react with said terephthalic acid and in an amount necessary to form an unsaturated solution containing from 10 to 17% by weight reacted terephthalic acid so as to react said partially purified terephthalic acid with said ammonia to form ammonium terephthalate in an aqueous unsaturated solution, separating said ammonium terephthalate from said further solution, and decomposing said ammonium terephthalate to produce terephthalic acid by heating said ammonium terephthalate at a temperaure of at least 275° C. at which impurities in said ammonium terephthalate decompose to produce terephthalic acid, but at a temperature below 300° C. so as to avoid the sublimation of said ammonium terephthalate, one of said separating steps and the decomposing step immediately following it being carried out by heating the solution treated during such step at its boiling point so as to separate said ammonium terephthalate, volatizing the remainder of said solution being separated and further heating the ammonium terephthalate so separated so as to decompose the same, and the other of said separating steps being carried out by contacting the solution treated during such step with ammonia gas until ammonium terephthalate is precipitated and physically removing the precipitated ammonium terephthalate from the solution from which it is precipitated.

2. A process as claimed in claim 1 wherein:

said forming of a first solution is carried out by contacting terephthalic acid with ammonia water containing from about 20 to about 35% by weight ammonia at a temperature of from about 20 to about 30° C.

3. A process as claimed in claim 1 wherein:

the first mentioned of said separating steps defined in claim 1 is said one of said separating steps.

References Cited
UNITED STATES PATENTS

| | | | |
|---|---|---|---|
| 2,664,440 | 12/1953 | Toland | 260—525 |
| 3,361,804 | 1/1968 | Alagy | 260—525 |
| 3,047,621 | 7/1962 | Tate | 260—525 |
| 1,943,892 | 1/1934 | Jaeger et al. | 260—525 |

LORRAINE A. WEINBERGER, Primary Examiner

R. D. KELLY, Assistant Examiner